(12) United States Patent
Weiss

(10) Patent No.: US 6,326,566 B1
(45) Date of Patent: *Dec. 4, 2001

(54) CONTACT UNIT FOR A COMBINED BRAKE/ BLINKER ARRANGMENT IN A VEHICLE

(75) Inventor: Hans-Günter Weiss, Worms (DE)

(73) Assignees: MDH Company, Inc., Cleveland, OH (US); Eaton Controls GmbH & Co KG, Langenlonsheim (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,476

(22) PCT Filed: Feb. 14, 1996

(86) PCT No.: PCT/DE96/00268

§ 371 Date: Nov. 17, 1997

§ 102(e) Date: Nov. 17, 1997

(87) PCT Pub. No.: WO96/26084

PCT Pub. Date: Aug. 29, 1996

(30) Foreign Application Priority Data

Feb. 23, 1995 (DE) .............................. 195 06 314

(51) Int. Cl.[7] .................................................. H01H 21/62
(52) U.S. Cl. ....................................... 200/6 R; 200/61.27
(58) Field of Search ................................. 200/61.27, 6 R, 200/7, 61.54, 11 EA

(56) References Cited

U.S. PATENT DOCUMENTS 2,748,207 * 5/1956 Clayton et al. ............... 200/61.27 X
3,255,319 * 6/1966 Paine .............................. 200/11 EA

* cited by examiner

Primary Examiner—Renee Luebke

(57) ABSTRACT

A contact unit for a lever actuated arrangement for activating brake lights and the flashing turn signal light function. A single contact bridge moved by the lever has three contacts, a first and second contact for closing respectively on left or right brake light circuit contacts and left or right turn signal light circuit contacts and a third contact for closing on a flasher circuit contact upon further lever movement in the same direction. Upon initial lever movement from a neutral position, a second bridge contact is operable to close a brake switch circuit contact with the opposite brake light circuit contact from the lever actuation.

2 Claims, 4 Drawing Sheets

CONTACT UNIT FOR A COMBINED BRAKE/BLINKER ARRANGMENT IN A VEHICLE

BACKGROUND OF THE INVENTION

The invention relates to an automotive combined brake light/turn signal light contact unit comprising a turn signal light circuit, a brake light circuit and an actuating lever with which at least one concomitantly movable contact bridge is associated.

In automobiles, especially passenger vehicles, using components jointly for various tasks is increasingly important. For example, combined taillights and brake lights have been developed which light up during day time, respectively during travel without lights turned on, only during a braking action. With the lights turned on, the respective light is illuminated with a specific brightness. As a braking action is initiated, the light turns brighter. In another design, other lamps installed in the light are activated also, causing the light to shine brighter.

SUMMARY OF THE INVENTION

The objective underlying the invention is creating a circuit assembly which allows using a brake light at the same time as a turn signal light.

An automotive combined brake light and turn signal light contact unit according to the invention, featuring a turn signal light circuit and a brake light circuit and an actuating lever with which is associated a concomitantly movable contact bridge, is thus designed such the a first contact bridge of the actuating lever is provided for the turn signal light circuit, the first contact bridge possessing contacts for conductors of the front and rear circuits of the turn signal light circuit, which contacts are closed appropriately upon actuation of actuating lever. Moreover, the first contact bridge includes a further contact for closing a switch in the turn signal light circuit upon further actuation of the actuating lever, allowing the flashing pulse to be switched to the contact bridge.

Consequently, the contact unit according to the invention allows the use of a flashing brake light on the vehicle. This provides in a simple manner for coupling the turn signal light circuit and the brake light circuit, the simultaneous cut-in of the front and rear circuits being accomplished by actuation of the further contact of the first contact bridge, that is, a joint cut-in of a circuit component.

Hence, it is possible to provide two separate turn signal light circuits, that is, a front and a rear circuit. Available at the same time is a normal turn signal light contacting for the front circuit of the turn signal light circuit. The rear circuit of the turn signal light circuit includes a lamp e.g. a bulb for joint use by the brake light circuit.

The function of the contact unit, respectively the circuit arrangement, is as follows: with the vehicle being braked, the two brake lights light up; and, if additionally a directional turn of the vehicle is meant to be indicated, the front turn signal light flashes then as usual after actuation of the actuating lever. The illumination of the brake light on the respective side changes over to pulsing operation at the same time as the corresponding front turn signal light. On the other hand, with only braking involved, i.e., without actuating the actuating lever and without activating the turn signal light circuit, the two lights are illuminated normally.

Provided favorably is a second contact bridge of the actuating lever, for the brake light circuit, which bridge is coupled to the first contact bridge and possesses contacts for the conductors of the circuit of the brake light circuit, which contacts are upon actuation of the actuating lever appropriately opened; and, upon further actuation of the actuating lever they are closed again by the respective contacts of the turn signal light circuit. This allows with particular reliability an exact combination of the brake light circuit and turn signal light circuit. Upon short-circuiting the two lamps by the contact bridge, the flashing pulse is then switched first to this contact bridge. Next, both lamps, front and rear, begin to flash simultaneously as a result.

According to the invention, the further contact of the first contact bridge is suitably provided for closing the plus line of the turn signal light circuit. This is an especially easy and effective measure to ensure the simultaneous activation of the front and rear turn signal light circuits.

In a preferred embodiment of the contact unit according to the invention, one or both contact bridges are three-point contact bridges.

A lift-off ramp is favorably provided, in the direction of motion, before the relevant contact closure position of the further contact of the first contact bridge. Such lift bridge safeguards an exact switching sequence. Lifting of the bridge ensures.

A sound introduction of force in the center of gravity region, for activation of the three-point bridges, is made possible in that the actuating lever features a bore for mounting the compression spring of the three-point bridge, said bore being located on a fulcrum. In this way, the compression spring is then activated exactly in the center of gravity, guaranteeing at the same time the positionally exact entrainment of both contact bridges. The bore is thus entrained and not the shanks of the contact bridge, which allows a more exact fabrication, thus achieving an accurate fit. The bridge can thereby be entrained very precisely in its tangential motion, so that both bridges have a very exact association with one another. In turn, this allows an exact observance of the switching pattern, or of the sequence of the contact points in the path diagram.

The invention is explained further hereafter with the aid of an exemplary embodiment and the drawing. This explanation is intended merely for a further illumination of the invention and should by no means be viewed as limiting the invention.

DETAILED DESCRIPTION OF THE INVENTION

Figure 1:
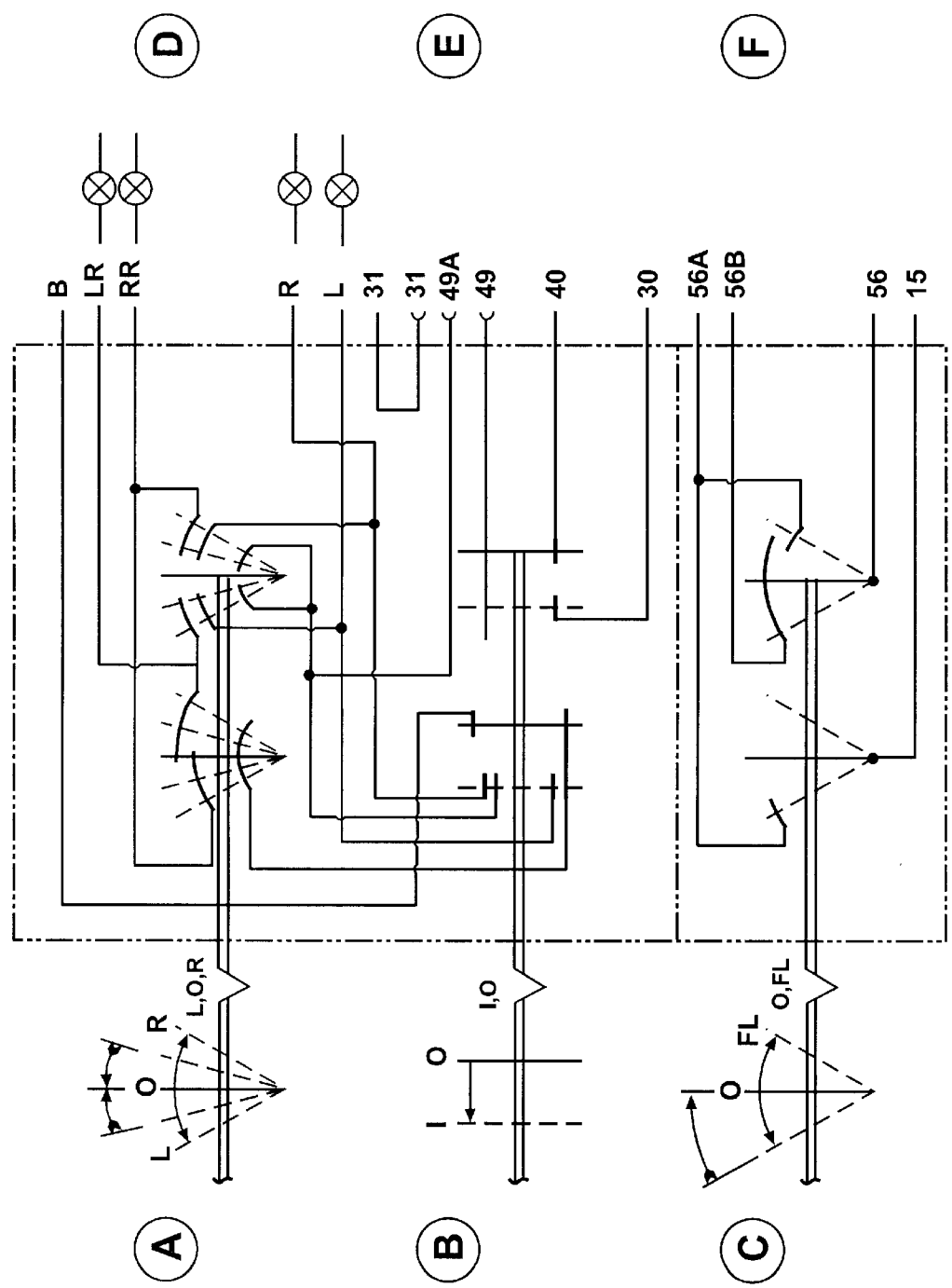
FIG. 1, a circuit diagram of a turn signal light system such as used in passenger cars.

FIG. 1 shows a wiring diagram of an automotive turn signal system such as used also conventionally. Circuit components not relating to the contact unit according to the invention are not explained in any detail. Shown on the left are the various switching positions of the actuating lever and their functions: at (A), the turn signal light function with holding contact and locking contact; at (B), flashing function and, at (C), high beam, or passing light, function. Shown at right are the various connections: at (D), brake light; at (E), turn signal light; and at (F), low beam. Illustrated in the center are the conductors, schematically in conjunction with the switching positions left and the functions right.

More detailed, B in conjunction with the brake light contacts (D) indicates the brake, while LR references the left brake light and RR the right brake light. For the turn signal light contacts, R references the right turn signal light, L the left turn signal light. The relay contacts are referenced 31, 40 and 49a, with 49a being the plus conductor. Contact 30 carries always voltage.

Figure 2:
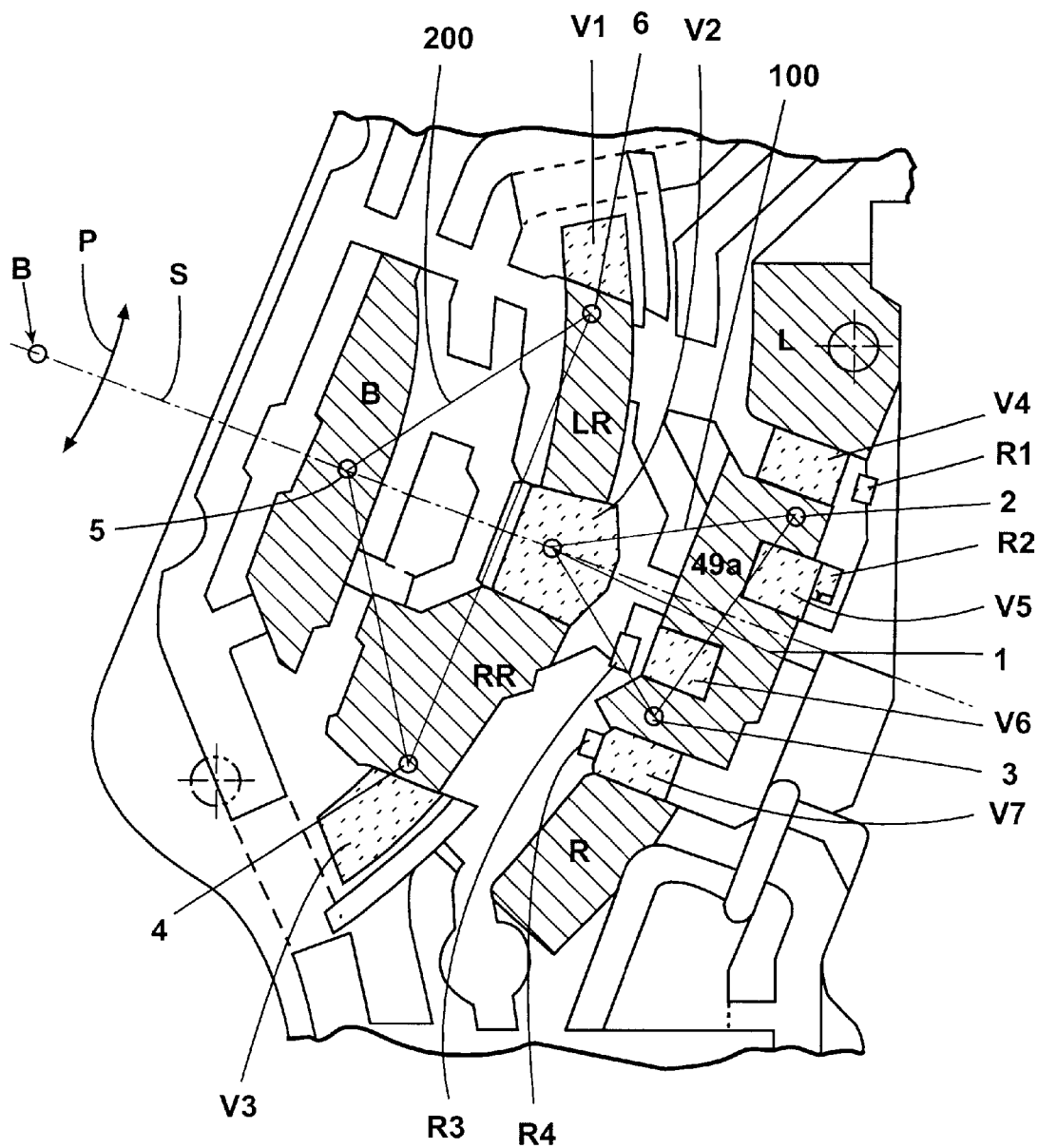
FIG. 2, a partial view of a contact unit according to invention.

In the partial view of a contact unit according to the invention, of FIG. 2, the conductors are shown crosshatched, the recesses by dotting. The contact descriptions have been adopted from FIG. 1. The conductors B, LR and RR are thus part of the brake light circuit. Conductors R, L and 49a are part of the turn signal light circuit. Recesses V1–V7 are disposed above and beneath the conductor LR, above and in the conductor 49a as well as above conductor R. Adjacent to conductor 49a, two lift-off ramps R1–R4 each are disposed, in FIG. 2, right and left and offset in relation to the switch axis S.

Furthermore, arrow P indicates the direction of swivel of the actuating lever, i.e., of the switch axis. Entered in the drawing, in addition to the nonoperative position (zero position) are the contact positions of two three-point contact bridges 100 and 200, each with three contact points 1 through 3 and 4–6 respectively.

The illustrated contact unit operates as follows: for giving a left-turn signal, the actuating lever is moved accordingly. In the process, contact 6 of contact bridge 200 separates from conductor LR. Instead, contact 1 of contact bridge 100 is pushed on the conductor LR. As the actuating lever is moved farther, contact 2 of contact bridge 100 proceeds onto conductor L. Once contact 1 of contact bridge 100 has closed the relevant contact with conductor LR, and contact 2 of contact bridge 100 with conductor L, moving the actuating lever farther, contact 3 of contact bridge 100 occasions with conductor 49a a simultaneous cut-in of the front and rear circuits of the turn signal light circuit, and thus the start of flashing front and rear. The same applies appropriately to flashing on the right-hand side.

The recesses V1 through V7 serve to guarantee defined states of contact, notably also as sparking chambers. A clean switching sequence is provided as well through the plastic ramps R1 through R4, with exact lift-off of the contact bosses.

Figure 3:
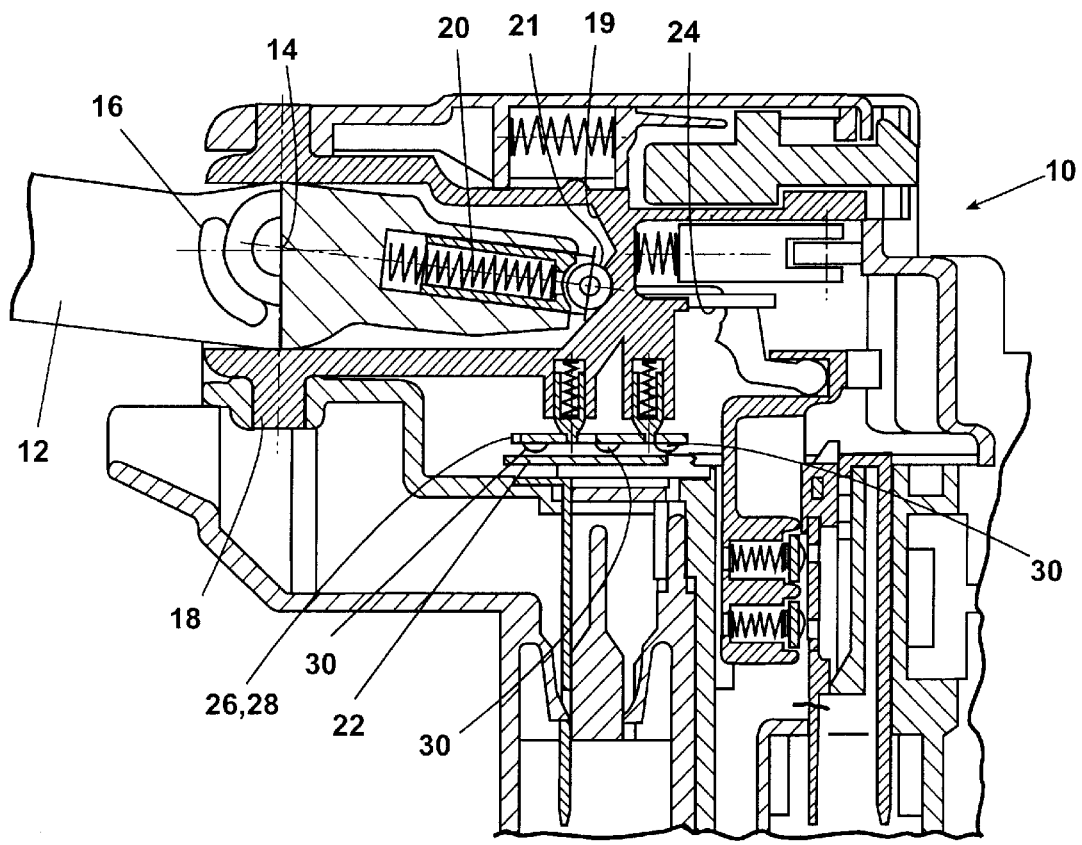
FIG. 3, partly in section, a view of the mechanical switch assembly including an actuating lever for turn signal light and light, with the contact bridge omitted.

FIG. 3 illustrates a partial sectional view of a mechanical switch assembly including an actuating lever for the turn signal light and vehicle lights.

Describing in the following are only those parts of FIG. 3 that are relevant for explaining the contact unit according to the invention. An actuating lever 12, which not only functions as a turn signal lever but also serves to turn on the high beam, or passing light, swivels accordingly about two axes and extends into the pertaining switch block 10. Referring to FIG. 3, receiver 18 has a cam track 19 engaged by a roller 21 disposed on the end of lever 12 and which is biased by spring 20 into contact with cam track 19. Reference numeral 14 denotes a pivotal axis for switching the headlights. A slot 17 provides guidance in switching the turn signal. Actuating lever 12 is fitted in a receptacle 18 with a compression spring 20 inserted in a recess provided in the end thereof Referenced at 22 is the contact board with the conductors etc., which in FIG. 2 is shown in more detail. The structure of the contact board 22 and of the contact bridges(s) is where the contact unit according to the invention differs from those of the prior art, disregarding the appropriately different conductor pattern and wiring.

Figure 4:
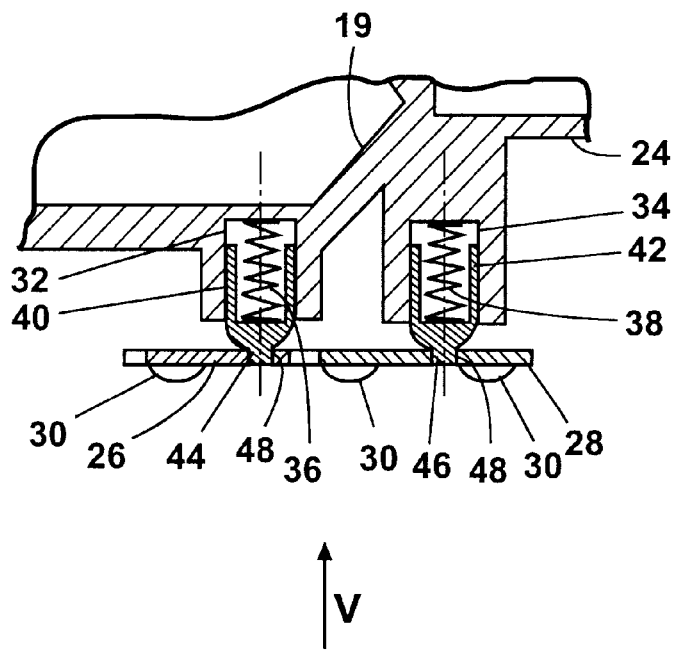
FIG. 4, a sectional view of two 3-point contact bridges such as used in the switch assembly relative to FIG. 1.
Figure 5:
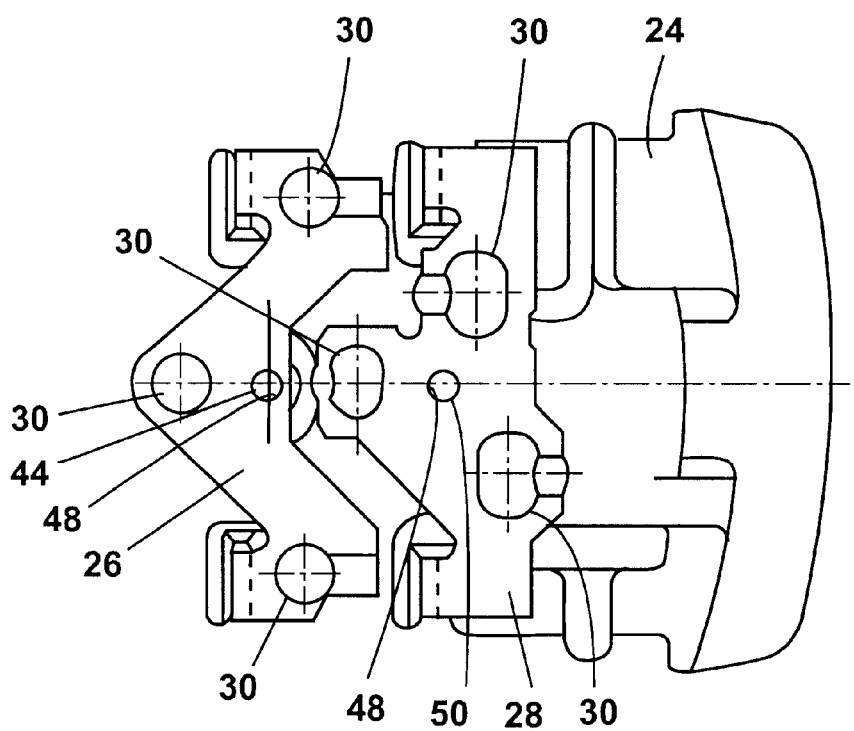
FIG. 5, a plan view relative to FIG. 4.

FIGS. 4 and 5 show two three-point contact bridges 26, 28 clipped into the contact bridge holder 24. The fixing and entrainment of the two contact bridges 26, 28 are effected by means of guide plungers 40, 42 which, for one, engage with pins 44, 46 the guide holes 48, 50 of the contact bridges 26, 28 and, for another, plunge into the bores 32, 34 of the contact bridge holder 24, stressing the compression springs 36, 38. The contact bridges 26, 28 support in the usual manner contact bosses 30, which by the force of the spring-loaded guide plungers 40, 42 are forced onto the contact board 22.

Movement of the lever 12 causes the bridges 26, 28 to be lifted by ramps R1, R2, R3, R4 such that contacts 30 are lifted from the surface of the contact board 22 to effect electrically clean switching.

What is claimed is:

1. A contact unit for a combined brake light/turn signal flasher arrangement for a vehicle having a flasher circuit, a brake light circuit and a turn signal circuit with an actuating lever user moveable either left or right from a neutral position, said unit comprising:

(a) a housing with separate contacts thereon for a flasher circuit, brake switch circuit, left and right brake lights and left and right turn signals;

(b) a first contact bridge disposed on said housing for sliding movement thereon and operative for movement by said actuating lever and having first and second contacts thereon for closing on left or right turn signal light contacts upon user selective movement of the actuating lever to either of a left or right first actuating position, said first contact bridge having a third contact thereon operative to close on said flasher circuit contact when said lever is moved further in a selected direction from said first actuating position to a second actuating position for flashing said turn signal.

2. The unit described in claim 1 wherein a lift off ramp is provided for effecting clean lift-off from a plurality of bridge contact bosses.

* * * * *